Jan. 2, 1940.  T. ROGATCHOFF  2,185,315
MEANS FOR DETECTING CRACKS IN CRANKPINS AND THE LIKE
Filed Jan. 9, 1939
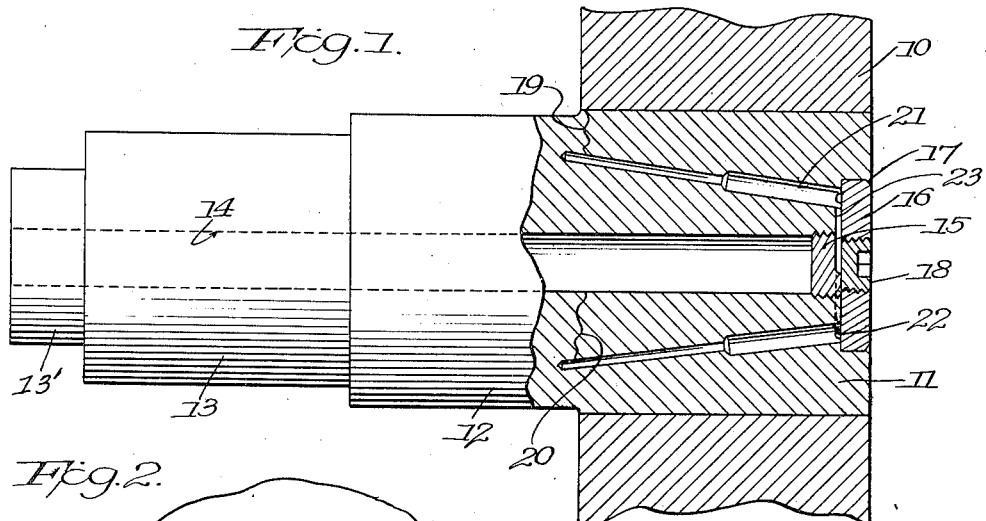
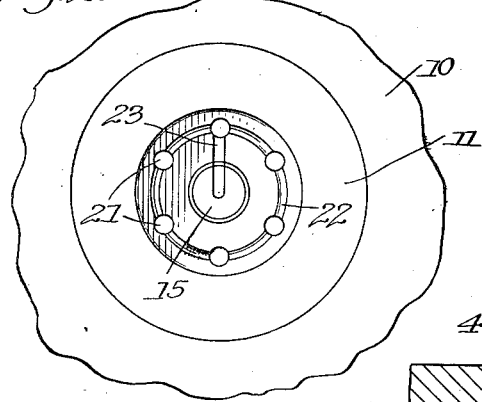
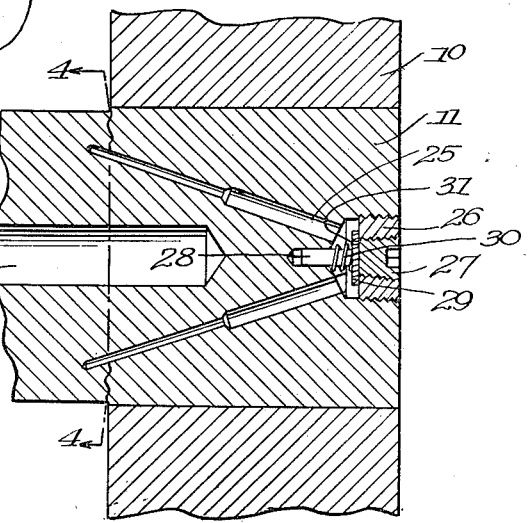
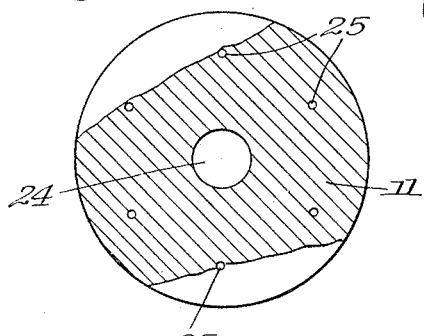
Inventor
T. Rogatchoff
By
Attorney Patented Jan. 2, 1940

2,185,315

UNITED STATES PATENT OFFICE 2,185,315

MEANS FOR DETECTING CRACKS IN CRANKPINS AND THE LIKE

Theodore Rogatchoff, Baltimore, Md.

Application January 9, 1939, Serial No. 250,023

2 Claims. (Cl. 73—51)

My invention relates to means for detecting cracks in crankpins and the like and it is applicable primarily to the detection of cracks in large crankpins such as are used on the drive wheels of locomotives and the like, though it may be usefully employed wherever large crankpins or axles are found which are liable to break and cause damage. In the case of locomotives for example, the damage done by a breaking crankpin may run into thousands of dollars due to a single breakage. I am familiar with various expedients that have heretofore been devised for testing crankpins and the like but they have not proved satisfactory, one reason being that such expedients are usually of such a nature that the test is made at one point only, so that a crankpin or an axle may be cracked to such an extent that it is about to break off and yet a test will not indicate the imperfect condition of the part unless the crack happens to extend across a particular point on the crankpin or axle.

It is an object of my invention to provide simple and effective means whereby a single easily applied test will indicate the presence of a crack extending over a small segment of a crankpin or axle, say about 15% of its circumference, at whatever part of this circumference such a crack may occur.

Referring to the drawing, which is made a part of this application and in which similar reference characters indicate similar parts:

Fig. 1 is an elevation, partly in section, of a crankpin and a portion of the wheel carrying the pin, Fig. 2, an elevation looking from the right in Fig. 1, Fig. 3, a view similar to Fig. 1, but showing a modified form of the invention, and Fig. 4, a section on line 4—4 of Fig. 3.

In the drawing, reference character 10 indicates a locomotive drive wheel or other suitable part to which the crankpin 11 is fixed. As in the conventional crankpins of this sort, the thickest portion of the pin is inside the wheel, this being followed by a reduced portion 12 for the side rod that connects all wheels together, a reduced portion 13 for the connecting rod which connects the wheel to the cylinders, and a reduced portion 13' for the valve gear driving connection. A bore extending centrally of the pin at 14 serves as usual to carry lubricant to the bearing portions, as by means of radial channels extending from the bore to the bearing portions.

In a case where the central bore 14 extends throughout the length of the crankpin as shown in Fig. 1, it will be closed at the wheel end by a plug 15. Beyond said plug the pin is recessed to receive a washer 16 which is held in place by hammering down the adjacent portion of the pin as indicated at 17, the crankpin (or axle) and the washer being more or less nearly flush at this end with a face of the wheel. The washer has a central opening that is threaded to receive a suitable plug 18, said opening forming a means for attachment of a fluid pressure connection when the plug is removed.

Cracks in crankpins and axles fixed to a wheel ordinarily start at a point within the confines of the wheel, so that it is impossible to see them because they are concealed by the hub or body of the wheel. Such a crack is indicated at 19. They may however start at the central bore 14 and work outwardly toward the periphery of the crankpin or axle, and such a crack is indicated at 20. To take care of both conditions and to permit determination of the presence of a crack of any substantial length by a single test I provide a series of longitudinal bores 21 each communicating with a recess in the form of an annular groove 22 just back of the washer 16. Preferably the bores 21 extend somewhat obliquely, so that the recess at the end of the pin may be comparatively small, while the bores in their inner or left hand ends approach near enough to the periphery of the pin to cause cracks to be indicated at a relatively early stage in the case of the usual crack which starts at the periphery of the pin. Preferably also these bores number six or more so as to detect without fail a crack extending about as much as 10% or 15% of the circumference of the pin. They are shown as being larger at the entrance end and being of reduced diameter at the other end, this being a matter of convenience in drilling the holes which are to form the bores 21. The bores extend beyond the zone where cracks develop, and usually somewhat beyond the face of the wheel at that side where the pin or axle projects therefrom.

As best shown in Fig. 2, in a preferred form of the invention a single groove extends from the center of the plug 15 to the annular groove 22, this insuring that the pressure connection can not be inserted far enough to prevent the pressure fluid from passing outward to said annular groove and to the longitudinal bores 21.

Fig. 3 shows a modified form of the invention in which the crankpin 11 has a central lubricating bore 24 that does not extend to the wheel end of the crankpin (this being a common construction). In the case of such a pin it will be found economical to drill or otherwise form a hole in the end of the crankpin, with bores 25 extending therefrom. These bores may communicate directly with the larger hole as shown and the hole may be closed by a threaded plug 26 with a central threaded opening to receive a removable plug 27, the opening of plug 26 receiving the pressure connection when a test is to be made. For the purpose of expediting the making of the test the bores 25 and the space behind plug 26 may be filled with liquid and kept so at all times. For this purpose I provide a small bore leading off from the main opening and arranged to receive the stem 28 of a disk-shaped valve 29 which closes the opening in plug 26 for which purpose a spring 30 may be provided which biases the valve toward closed position. The disk is provided with a leak opening indicated at 31, thereby permitting the pressure to be reduced in sufficient amount, but without the loss of much liquid, while the pressure connection is being removed and the plug 27 is being replaced. By the use of this construction the space at the larger end of the crankpin may be filled with liquid before the crankpin is united to the wheel by pressure, in the usual manner. The presence of the liquid in this space saves time since otherwise the space will be filled with air and time must be wasted in forcing out the air through any crack that may have developed, before the liquid can emerge and give a certain indication of the presence of a crack.

The term "crankpin" is used in the claims for want of a generic term, but it is to be understood that fixed axles and any other analogous devices are intended to be covered. It is to be noted that by my invention a single quickly made test is sufficient for a wheel, and failure to show leakage is practically a guarantee that the parts are in safe working condition.

It will be obvious to those skilled in the art that many changes may be made in the device of my invention all without departing from the spirit of my invention; therefore, I do not limit myself to what is shown in the drawing and described in the specification but only as required by the state of the art.

Having thus fully described my invention, what I claim is:

1. The combination of a wheel, a crankpin or axle fixed in a bore of said wheel and projecting therefrom at one side of the wheel, the other end of said crankpin or axle being substantially flush with a face of the wheel, said crankpin or axle having a recess in said flush face and having a series of bores spaced about its circumference and extending lengthwise thereof from said recess approximately to the zone of probable breakage of said crankpin or axle, and means in connection with said recess for attachment of a source of fluid pressure.

2. The combination of a wheel, a crankpin or axle fixed in a bore of said wheel and projecting at one side of said wheel, the other end of said crankpin or axle being substantially flush with a face of said wheel, said crankpin or axle having a recess in said flush face and circumferentially spaced bores extending from said recess lengthwise of the crankpin or axle past the zone of probable breakage of the same, there being in said flush face a threaded pressure connection opening leading to said recess, and a valve in said recess biased to close said opening.

THEODORE ROGATCHOFF.